United States Patent
Chern et al.

(10) Patent No.: US 9,800,154 B2
(45) Date of Patent: *Oct. 24, 2017

(54) VOLTAGE SUPPLY UNIT AND METHOD FOR OPERATING THE SAME

(71) Applicant: TAIWAN SEMICONDUCTOR MANUFACTURING COMPANY, LTD., Hsinchu (TW)

(72) Inventors: Chan-Hong Chern, Palo Alto, CA (US); Tsung-Ching Huang, Mountain View, CA (US); Chih-Chang Lin, San Jose, CA (US); Ming-Chieh Huang, San Jose, CA (US); Fu-Lung Hsueh, Kaohsiung (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/147,383

(22) Filed: May 5, 2016

(65) Prior Publication Data
US 2016/0248330 A1    Aug. 25, 2016

Related U.S. Application Data

(63) Continuation of application No. 14/214,362, filed on Mar. 14, 2014, now Pat. No. 9,360,876.

(51) Int. Cl.
*G05F 1/575* (2006.01)
*H02M 3/158* (2006.01)
(Continued)

(52) U.S. Cl.
CPC ............ *H02M 3/158* (2013.01); *G05F 1/575* (2013.01); *G05F 3/262* (2013.01); *H02M 1/08* (2013.01)

(58) Field of Classification Search
CPC ................................. G05F 3/262; G05F 1/575
See application file for complete search history.

(56) References Cited

U.S. PATENT DOCUMENTS

| | | | | | |
|---|---|---|---|---|---|
| 3,953,807 | A | * | 4/1976 | Schade, Jr. | ............. G05F 3/262 330/277 |
| 5,892,402 | A | * | 4/1999 | Tsubaki | ................... G05F 3/262 323/315 |

(Continued)

FOREIGN PATENT DOCUMENTS

| CN | 102591391 | 7/2012 |
|---|---|---|
| CN | 102645944 | 8/2012 |

(Continued)

OTHER PUBLICATIONS

Office Action dated Dec. 22, 2016 from corresponding application No. CN 201410310873.2.

(Continued)

*Primary Examiner* — Jue Zhang
*Assistant Examiner* — Lakaisha Jackson
(74) *Attorney, Agent, or Firm* — Hauptman Ham, LLP

(57) ABSTRACT

A voltage supply unit includes a regulator unit, a current mirror, and a cascode unit. The regulator unit is configured to receive first and second voltage signals and generate a third voltage signal. The current mirror is configured to generate first and second current signals based on the third voltage signal. The cascode unit includes a first terminal configured to receive the first current signal, a second terminal configured to receive a first bias voltage signal, a third terminal configured to receive a second bias voltage signal, and a fourth terminal electrically connected to the regulator unit. An output voltage supply signal is controlled by the second current signal.

20 Claims, 6 Drawing Sheets

(51) Int. Cl.
    G05F 3/26      (2006.01)
    H02M 1/08      (2006.01)

(56) References Cited

U.S. PATENT DOCUMENTS

| | | | |
|---|---|---|---|
| 6,897,717 B1* | 5/2005 | Eddleman | G05F 3/262 |
| | | | 327/108 |
| 2002/0101292 A1* | 8/2002 | Maneatis | G05F 3/262 |
| | | | 331/185 |
| 2006/0043945 A1 | 3/2006 | Sohn et al. | |
| 2006/0164053 A1 | 7/2006 | Walter et al. | |
| 2012/0176109 A1* | 7/2012 | Riederer | G05F 1/56 |
| | | | 323/282 |
| 2012/0205978 A1* | 8/2012 | Wong | G05F 1/56 |
| | | | 307/31 |

FOREIGN PATENT DOCUMENTS

| | | |
|---|---|---|
| KR | 10-2006-0019164 | 3/2006 |
| KR | 10-1238296 | 2/2013 |
| TW | 500995 | 9/2002 |
| TW | I363261 | 5/2012 |

OTHER PUBLICATIONS

Notice of Allowance dated Mar. 31, 2016 and English translation from corresponding No. KR 10-2014-0144025.
Office Action dated Oct. 1, 2015 from corresponding No. TW 103123153.

* cited by examiner

VOLTAGE SUPPLY UNIT AND METHOD FOR OPERATING THE SAME

PRIORITY CLAIM

The present application is a continuation of U.S. application Ser. No. 14/214,362, filed Mar. 14, 2014, which is incorporated herein by reference in its entirety.

BACKGROUND

The semiconductor integrated circuit (IC) industry has produced a wide variety of devices to address issues in a number of different areas. Some of these devices have differing power requirements. As ICs have become smaller and more complex, operating voltages continue to decrease for optimizing IC performance.

BRIEF DESCRIPTION OF THE DRAWINGS

One or more embodiments are illustrated by way of example, and not by limitation, in the figures of the accompanying drawings, wherein elements having the same reference numeral designations represent like elements throughout. It is emphasized that, in accordance with standard practice in the industry various features may not be drawn to scale and are used for illustration purposes only. In fact, the dimensions of the various features in the drawings may be arbitrarily increased or reduced for clarity of discussion. One or more embodiments illustrated in the drawings, incorporated herein in their entirety, include the following.

DETAILED DESCRIPTION

Figure 1:
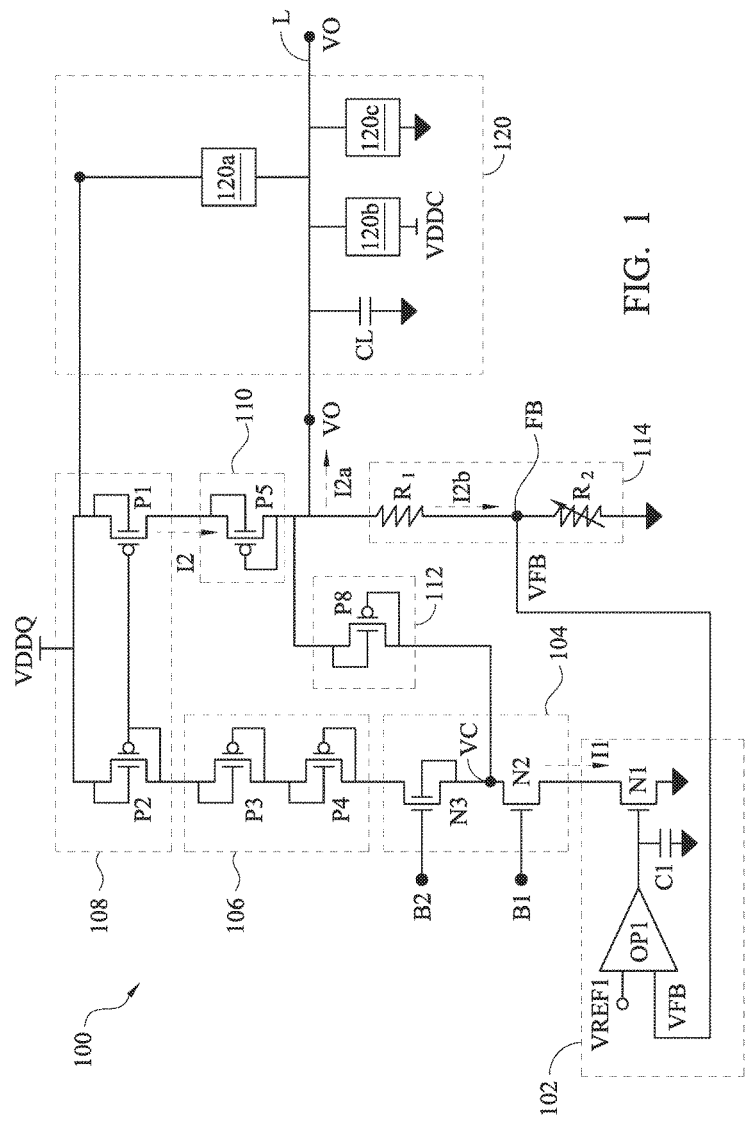
FIG. 1 is a schematic diagram of a voltage supply unit in accordance with one or more embodiments.

The following disclosure provides many different embodiments, or examples, for implementing different features of the disclosed subject matter. Specific examples of components and arrangements are described below to simplify the present disclosure. These are examples and are not intended to be limiting.

This description of the various embodiments is intended to be read in connection with the accompanying drawings, which are to be considered part of the entire written description. In the description, relative terms such as "before," "after," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the system be constructed or operated in a particular orientation. Terms concerning attachments, coupling and the like, such as "connected" and "interconnected," refer to a relationship wherein components are attached to one another either directly or indirectly through intervening components, unless expressly described otherwise.

FIG. 1 is a schematic diagram of a voltage supply unit 100 in accordance with one or more embodiments. Voltage supply unit 100 comprises a regulator unit 102, a cascode unit 104, a first absorption unit 106, a first current mirror 108, a second absorption unit 110, a voltage clamping unit 112 and resistors R1 and R2. Voltage supply unit 100 is connected to voltage supply VDDQ and a load unit 120. Voltage supply unit 100 is configured to receive a first input signal VREF1 and voltage supply VDDQ. Voltage supply unit 100 is configured to send an output voltage signal VO to load unit 120.

In some embodiments, output voltage signal VO is an intermediate voltage signal that is less than voltage supply VDDQ. In some embodiments, output voltage supply VO is an intermediate voltage signal that is greater than voltage supply VDDQ. In some embodiments, voltage supply VDDQ is a high-voltage supply greater than at least one of VDD or intermediate voltage signal VO. In some embodiments, voltage supply VDDQ is an integer multiple of VDD. In some embodiments, output voltage signal VO is substantially equal to VDD. In some embodiments, output voltage signal VO is an integer multiple of VDD, but less than voltage supply VDDQ. In some embodiments, voltage supply unit 100 is configured to generate an output voltage signal VO substantially equal to 2*VDD. In some embodiments, a low-voltage level refers to a voltage level less than voltage supply VDDQ and intermediate voltage signal VO. In some embodiments, VDD is characterized as a low-voltage level. In some embodiments, ground is characterized as a low-voltage level. In some embodiments, VDD is a voltage ranging from about 0.6 volts to about 1.2 volts. In some embodiments, voltage supply VDDQ is substantially equal to 2.5 volts. In some embodiments, voltage supply VDDQ is substantially equal to 3.3 volts. In some embodiments, voltage supply VDDQ is substantially equal to 5.0 volts.

In some embodiments, one or more of the semiconductor devices contained in voltage supply unit 100 comprise FinFET or Tri-gate devices. In some embodiments, one or more of the semiconductor devices contained in voltage supply unit 100 are produced by a 10 nanometer (nm), 14 nm or 16 nm semiconductor manufacturing process. In some embodiments, one or more of the semiconductor devices contained in voltage supply unit 100 are produced by a 65 nm or 90 nm semiconductor manufacturing process. In some embodiments, one or more of the semiconductor devices contained in voltage supply unit 100 comprise thin-gate devices or low-voltage devices. In some embodiments, a thin-gate device comprises one or more semiconductor devices in an integrated circuit where the equivalent oxide thickness of the one or more semiconductor devices is less than the equivalent oxide thickness of other semiconductor devices contained in the integrated circuit. In some embodiments, a low-voltage device comprises a semiconductor device in an integrated circuit where the Vdd of the semiconductor device is less than the Vdd of other semiconductor devices contained in the integrated circuit.

In some embodiments, for a 10 nm semiconductor manufacturing process, a thin-gate device comprises a semiconductor device with an equivalent oxide thickness ranging from about 5 angstroms (Å) to about 8 Å. In some embodiments, for a 10 nm semiconductor manufacturing process, a low-voltage device comprises a semiconductor device with a Vdd ranging from about 0.7 volts to about 0.9 volts.

In some embodiments, for a 16/14 nm semiconductor manufacturing process, a thin-gate device comprises a semiconductor device with an equivalent oxide thickness ranging from about 7 Å to about 10 Å. In some embodiments, for a 16/14 nm semiconductor manufacturing process, a low-voltage device comprises a semiconductor device with a Vdd ranging from about 0.8 volts to about 0.95 volts.

In some embodiments, for a 22/20 nm semiconductor manufacturing process, a thin-gate device comprises a semiconductor device with an equivalent oxide thickness ranging from about 8 Å to about 11 Å. In some embodiments, for a 22/20 nm semiconductor manufacturing process, a low-voltage device comprises a semiconductor device with a Vdd ranging from about 0.85 volts to about 1.0 volts.

In some embodiments, for a 32/28 nm semiconductor manufacturing process, a thin-gate device comprises a semiconductor device with an equivalent oxide thickness ranging from about 9 Å to about 12 Å. In some embodiments, for a 32/28 nm semiconductor manufacturing process, a low-voltage device comprises a semiconductor device with a Vdd ranging from about 0.9 volts to about 1.05 volts.

In some embodiments, for a 45/40 nm semiconductor manufacturing process, a thin-gate device comprises a semiconductor device with an equivalent oxide thickness ranging from about 10 Å to about 15 Å. In some embodiments, for a 45/40 nm semiconductor manufacturing process, a low-voltage device comprises a semiconductor device with a Vdd ranging from about 1.0 volts to about 1.1 volts.

In some embodiments, for a 65 nm semiconductor manufacturing process, a thin-gate device comprises a semiconductor device with an equivalent oxide thickness ranging from about 11 Å to about 16 Å. In some embodiments, for a 65 nm semiconductor manufacturing process, a low-voltage device comprises a semiconductor device with a Vdd ranging from about 1.1 volts to about 1.2 volts.

In some embodiments, for a 90 nm semiconductor manufacturing process, a thin-gate device comprises a semiconductor device with an equivalent oxide thickness ranging from about 12 Å to about 20 Å. In some embodiments, for a 90 nm semiconductor manufacturing process, a low-voltage device comprises a semiconductor device with a Vdd ranging from about 1.2 volts to about 1.5 volts.

Regulator unit 102 is connected to cascode unit 104, resistor R1 and resistor R2. Regulator unit 102 is configured to receive a first input signal VREF1 and a second input signal VFB. Regulator unit 102 is configured to provide a bias voltage to an n-type metal oxide semiconductor (NMOS) transistor N1 and to control a source current I1 received from cascode unit 104.

Regulator unit 102 comprises operational amplifier OP1, NMOS transistor N1 and capacitor C1. Operational amplifier OP1 is configured to receive first input signal VREF1 and second input signal VFB. The first input signal VREF1 is a reference voltage at the non-inverting terminal of the operational amplifier OP1. The second input signal VFB is a voltage at the inverting terminal of the operational amplifier OP1. Operational amplifier OP1 is configured to send an output signal to NMOS transistor N1 and capacitor C1. The output signal of the operational amplifier OP1 is a voltage applied to the gate of NMOS transistor N1 and capacitor C1. The operational amplifier OP1 includes two input terminals and one output terminal. The first input terminal of the operational amplifier OP1 is connected to the source of the first input signal VREF1. The second input terminal of the operational amplifier OP1 is connected to the source of the second input signal VFB. In some embodiments, operational amplifier OP1 is configured in a negative feedback configuration such that the source of the second input signal VFB is connected to resistors R1 and R2 at node FB. The output of the operational amplifier OP1 is connected to NMOS transistor N1 and capacitor C1. In some embodiments, operational amplifier OP1 is configured in a comparator configuration. In some embodiments, operational amplifier OP1 includes a comparator device. In some embodiments, a p-type metal oxide semiconductor (PMOS transistor) is used in regulator unit 102.

The gate of NMOS transistor N1 is connected to operational amplifier OP1 and is configured to receive the output signal of the operational amplifier OP1. The drain of NMOS transistor N1 is connected to cascode unit 104 (by the source of NMOS transistor N2). The source of NMOS transistor N1 is connected to ground. The regulator unit 102 is configured to maintain the gate voltage of NMOS transistor N1, which controls the source current I1 received from cascode unit 104. In some embodiments, given a first input signal VREF1 and a second signal VFB, the regulator unit 102 is configured to control the gate voltage of NMOS transistor N1. The gate voltage of NMOS transistor N1 controls the source current I1 received from cascode unit 104. In some embodiments, the output voltage signal VO of voltage supply unit 100 is fed back to the operational amplifier OP1 by node FB and is compared with the first input signal VREF1 to provide a desired supply voltage (output voltage signal VO).

Capacitor C1 is connected to the gate of NMOS transistor N1, the output of operational amplifier OP1 and ground.

Cascode unit 104 is connected to regulator unit 102, first absorption unit 106 and voltage clamping unit 112. Cascode unit 104 is connected to voltage clamping unit 112 by node VC. Cascode unit 104 is configured to receive a first bias signal B1, a second bias signal B2, source current I1 and a clamp voltage from node VC. Cascode unit 104 is configured to send source current I1 to regulator unit 102. Cascode unit 104 comprises NMOS transistor N2 and NMOS transistor N3. In some embodiments, cascode unit 104 prevents electrical over stress (EOS) in voltage supply unit 100. In some embodiments, one or more PMOS transistors are used in cascode unit 104.

The gate of NMOS transistor N2 is connected to the source of first bias signal B1. In some embodiments, first bias signal B1 is a bias voltage received from a bias generation circuit (not shown). In some embodiments, first bias signal B1 is a bias voltage substantially equal to VDD and is received from a bias generation circuit (not shown). The drain of NMOS transistor N2 is connected to the source of NMOS transistor N3 and to voltage clamping unit 112 (by the drain of PMOS diode-connected transistor P8). In some embodiments, voltage clamping unit 112 reduces EOS in NMOS transistors N2 and N3. In some embodiments, voltage clamping unit 112 is configured to clamp the voltage at node VC at a first intermediate voltage. In some embodiments, the first intermediate voltage is substantially equal to a voltage ranging between about the first bias signal B1 and about the second bias signal B2. In some embodiments, the first intermediate voltage is substantially equal to a voltage ranging between about VDD and about 2*VDD. In some embodiments, the first intermediate voltage is substantially equal to a voltage of about 1.5*VDD. The source of NMOS transistor N2 is connected to the drain of NMOS transistor N1. In some embodiments, the voltage clamping unit 112 is implemented with more than one PMOS diode-connected transistors. In some embodiments, the voltage clamping unit 112 is implemented with one or more NMOS diode-connected transistors.

The gate of NMOS transistor N3 is connected to the source of second bias signal B2. In some embodiments, second bias signal B2 is a bias voltage received from a bias generation circuit (not shown). In some embodiments, second bias signal B2 is a bias voltage substantially equal to 2*VDD and is received from a bias generation circuit (not shown). The drain of NMOS transistor N3 is connected to first absorption unit 106 (by the drain of PMOS transistor P4). The source of NMOS transistor N3 is connected to the drain of NMOS transistor N2 and to voltage clamping unit 112 (by the drain of NMOS transistor N4). In some embodiments, voltage clamping unit 112 reduces EOS in NMOS transistors N2 and N3. In some embodiments, voltage clamping unit 112 is configured to clamp the voltage at node VC at a first intermediate voltage. In some embodiments, the first intermediate voltage is substantially equal to a voltage ranging between about the first bias signal B1 and about the second bias signal B2. In some embodiments, the first intermediate voltage is substantially equal to a voltage ranging between about VDD and about 2*VDD. In some embodiments, the first intermediate voltage is substantially equal to a voltage of about 1.5*VDD. The body of NMOS transistor N3 is connected to the source of NMOS transistor N3.

First absorption unit 106 is connected to cascode unit 104 and first current mirror 108. First absorption unit 106 is configured to receive a source current I1 from first current mirror 108. First absorption unit 106 is configured to send source current I1 to cascode unit 104. First absorption unit 106 comprises PMOS transistor P3 and PMOS transistor P4. In some embodiments, first absorption unit 106 is configured to absorb one or more voltage drops from the voltage supply VDDQ. In some embodiments, one or more NMOS transistors are used in first absorption unit 106.

The source of PMOS transistor P3 is connected to first current mirror 108 (by the drain of PMOS transistor P2) and is configured to receive the source current I1. The body of PMOS transistor P3 is connected to the source of PMOS transistor P3. PMOS transistor P3 is connected in a diode configuration such that the gate of PMOS transistor P3 is connected to the drain of PMOS transistor P3. The drain and gate of PMOS transistor P3 are connected to the source of PMOS transistor P4. The drain of PMOS transistor P3 is configured to send the source current I1 to PMOS transistor P4.

The source of PMOS transistor P4 is connected to the drain of PMOS transistor P3 and is configured to receive the source current I1. The body of PMOS transistor P4 is connected to the source of PMOS transistor P4. PMOS transistor P4 is connected in a diode configuration such that the gate of PMOS transistor P4 is connected to the drain of PMOS transistor P4. The drain and gate of PMOS transistor P4 are connected to the drain of NMOS transistor N3. The drain of PMOS transistor P4 is configured to send the source current I1 to NMOS transistor N3.

First current mirror 108 is connected to first absorption unit 106 and second absorption unit 110. First current mirror 108 is configured to receive a source current I1 from voltage supply VDDQ. First current mirror 108 is configured to send a source current I1 to first absorption unit 106 and to send a supply current I2 to second absorption unit 110. In some embodiments, the supply current I2 is mirrored from the source current I1. For example, source current I1 is used to set the gate voltage of PMOS transistors P2 and P1; and the gate voltage of PMOS transistor P1 is used to set the supply current I2. In some embodiments, one or more NMOS transistors are used in first current mirror 108.

The source of PMOS transistor P2 is connected to voltage supply VDDQ and is configured to receive the source current I1. The body of PMOS transistor P2 is connected to the source of PMOS transistor P2. The gate of PMOS transistor P2 is connected to the gate of PMOS transistor P1. PMOS transistor P2 is connected in a diode configuration such that the gate of PMOS transistor P2 is connected to the drain of PMOS transistor P2. The drain and gate of PMOS transistor P2 are connected to the source of PMOS transistor P3. The drain of PMOS transistor P2 is configured to send the source current I1 to the source of PMOS transistor P3.

The source of PMOS transistor P1 is connected to voltage supply VDDQ and is configured to receive the supply current I2. The body of PMOS transistor P1 is connected to the source of PMOS transistor P1. The gate of PMOS transistor P1 is connected to the gate of PMOS transistor P2. The drain of PMOS transistor P1 is connected to second absorption unit 110 (by the source of PMOS transistor P5). The drain of PMOS transistor P1 is configured to send the supply current I2 to the source of PMOS transistor P5.

Second absorption unit 110 is connected to first current mirror 108, voltage clamping unit 112, resistor R1 and load unit 120. Second absorption unit 110 is configured to receive a supply current I2 from first current mirror 108. Second absorption unit 110 is configured to send supply current I2 to load unit 120 and resistor R1. Second absorption unit 110 comprises PMOS transistor P5. In some embodiments, second absorption unit 110 comprises more than one PMOS transistor P5. In some embodiments, second absorption unit 110 is configured to absorb one or more voltage drops from the voltage supply VDDQ. In some embodiments, one or more NMOS transistors are used in second absorption unit 110. In some embodiments, second absorption unit 110 is optional. In some embodiments, second absorption unit 110 is not used where supply voltage VDDQ is substantially equal to 3*VDD and the output voltage VO is substantially equal to 2*VDD. In some embodiments, second absorption unit 110 is not used where the difference between supply voltage VDDQ and the output voltage VO is substantially equal to or less than VDD.

The source of PMOS transistor P5 is connected to first current mirror 108 and is configured to receive the supply current I2. The body of PMOS transistor P5 is connected to the source of PMOS transistor P5. PMOS transistor P5 is connected in a diode configuration such that the gate of PMOS transistor P5 is connected to the drain of PMOS transistor P5. The drain and gate of PMOS transistor P5 are connected to the source of NMOS transistor N4, resistor R1 and load unit 120. The drain of PMOS transistor P5 is configured to send the supply current I2 to load unit 120 and resistor R1.

Voltage clamping unit 112 is connected to second absorption unit 110, resistor R1, load unit 120 and cascode unit 104. Voltage clamping unit 112 comprises a diode-connected PMOS transistor P8. In some embodiments, voltage clamping unit 112 reduces EOS in NMOS transistors N2 and N3. In some embodiments, voltage clamping unit 112 is configured to clamp the voltage at node VC at a first intermediate voltage. In some embodiments, the first intermediate voltage is substantially equal to a voltage ranging between about the first bias signal B1 and about the second bias signal B2. In some embodiments, the first intermediate voltage is substantially equal to a voltage ranging between about VDD and about 2*VDD. In some embodiments, the first intermediate voltage is substantially equal to a voltage of about 1.5*VDD. The source of NMOS transistor N2 is connected to the drain of NMOS transistor N1. In some embodiments, the voltage clamping unit 112 is implemented with more than one PMOS diode-connected transistors. In some embodiments, the voltage clamping unit 112 is implemented with one or more NMOS diode-connected transistors. In some embodiments, voltage clamping unit 112 is optional.

The source of PMOS transistor P8 is connected to second absorption unit 110, resistor R1 and load unit 120. The body of PMOS transistor P8 is connected to the source of PMOS transistor P8. PMOS transistor P8 is connected in a diode configuration such that the gate of PMOS transistor P8 is connected to the drain of PMOS transistor P8. The drain and gate of PMOS transistor P8 are connected to the drain of NMOS transistor N2 and the source of NMOS transistor N3.

Resistor R1 is connected to resistor R2, second absorption unit 110, voltage clamping unit 112, load unit 120 and regulator unit 102. Resistor R1 is connected to resistor R2 and regulator unit 102 by node FB. In some embodiments, resistor R1 and resistor R2 form an adjustable voltage divider unit. Current I2b flows through resistor R1. Resistor R1 and R2 form an adjustable voltage divider 114.

Resistor R2 is connected to resistor R1, regulator unit 102 and ground. One end of Resistor R2 is connected to resistor R1 and regulator unit 102 by node FB. Another end of resistor R2 is connected to ground. In some embodiments, resistor R2 and resistor R1 form an adjustable voltage divider unit. Current I2b flows through resistor R2. In some embodiments, resistor R2 is configured to be a variable resistor. In some embodiments, resistor R2 and resistor R1 form an adjustable voltage divider unit since resistor R2 is configured to be a variable resistor. For example, the voltage at node FB is represented by formula 1:

$$V_{FB} = \frac{VO * R2}{R1 + R2} \quad (1)$$

Where $V_{FB}$ is the voltage at node FB, VO is the output voltage signal VO of voltage supply unit 100, R1 is the value of resistor R1 and R2 is the value of resistor R2.

As seen from formula 1, the value of resistor R2 controls the voltage $V_{FB}$ at node FB. In some embodiments, resistor R2 controls the amount of voltage $V_{FB}$ fed back to the regulator unit 102. In some embodiments, by adjusting the value of resistor R2, the amount of voltage $V_{FB}$ fed back to the regulator unit 102 is also adjusted.

Voltage supply unit 100 is configured to output voltage signal VO to load unit 120. Voltage supply unit 100 is configured to output current I2a to load unit 120. In some embodiments, output voltage signal VO is an intermediate voltage signal less than voltage supply VDDQ. In some embodiments, voltage supply VDDQ is an integer multiple of VDD.

Load unit 120 comprises load unit 120a, load unit 120b, load unit 120c, and load capacitor CL. In some embodiments, load units 120a, 120b and 120c are load units configured with substantially different input voltage requirements, and voltage supply unit 100 is capable of providing the substantially different voltage requirements of load unit 120. In some embodiments, load units 120a, 120b and 120c are load units configured with substantially the same input voltage requirements and voltage supply unit 100 is capable of providing the substantially similar voltage requirements of load unit 120. In some embodiments, voltage supply VDDQ is substantially equal to 3*VDD, and the voltage of load line L is substantially equal to 2*VDD.

Load unit 120a is connected to VDDQ and load line L. In some embodiments, the voltage of load line L is substantially equal to 2*VDD.

Load unit 120b is connected to VDDC and load line L. In some embodiments, the voltage of load line L is substantially equal to 2*VDD. In some embodiments, voltage supply VDDC is substantially equal to VDD.

Load unit 120c is connected to load line L and ground. In some embodiments, the voltage of load line L is substantially equal to 2*VDD.

Load capacitor CL is connected to load line L and ground. In some embodiments, the voltage of load line L is substantially equal to 2*VDD.

Figure 2:
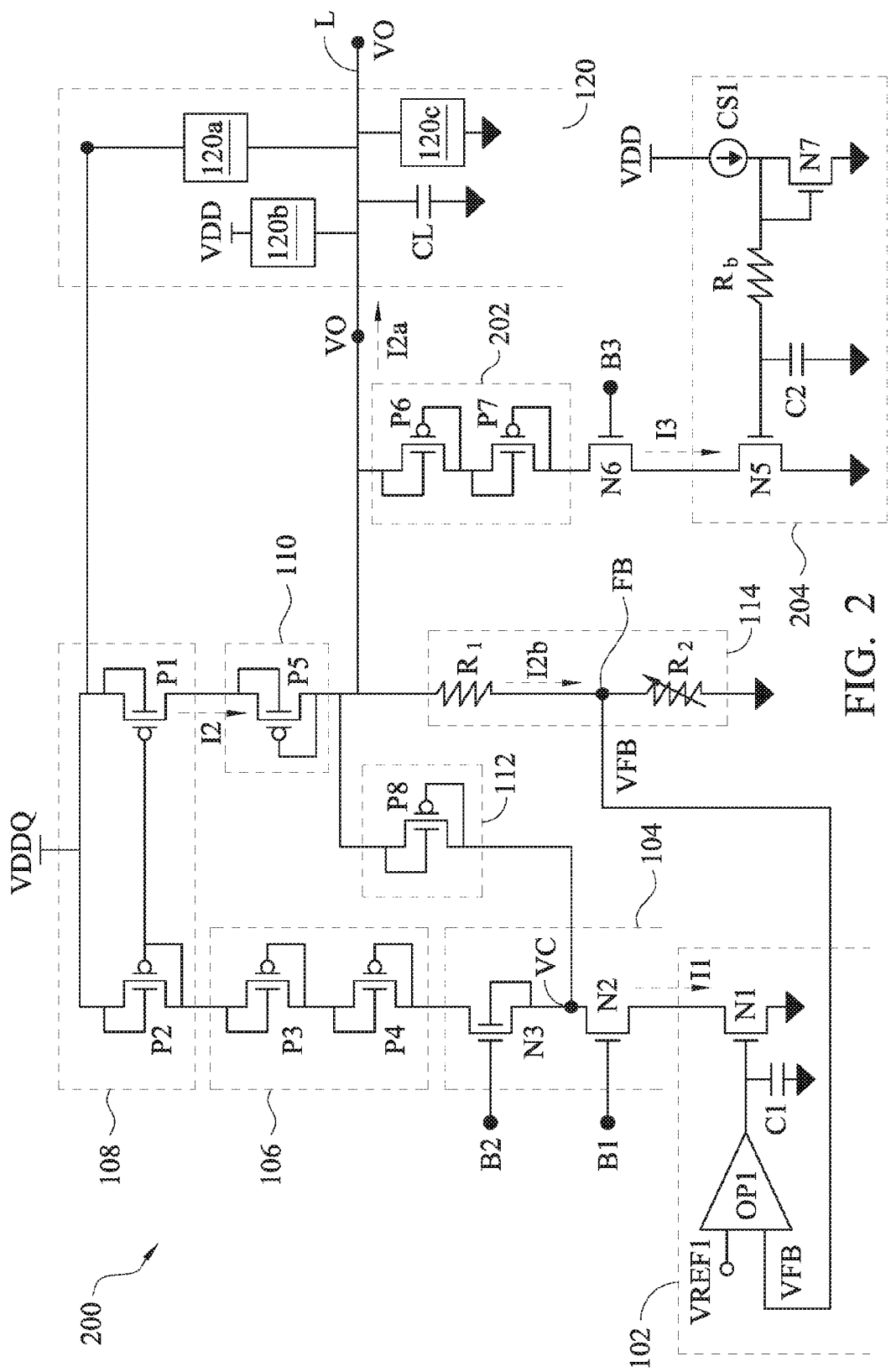
FIG. 2 is a schematic diagram of a voltage supply unit in accordance with one or more embodiments.

FIG. 2 is a schematic diagram of a voltage supply unit 200 in accordance with one or more embodiments. Voltage supply unit 200 is an embodiment of the voltage supply unit 100 shown in FIG. 1. As shown in FIG. 2, similar elements have a same reference number as shown in FIG. 1. In comparison with voltage supply unit 100 (shown in FIG. 1), voltage supply unit 200 also includes a third absorption unit 202, NMOS transistor N6 and a second current mirror 204. In some embodiments, third absorption unit 202, NMOS transistor N6 and a second current mirror 204 provide stability to voltage supply unit 200 during low-load or no-load conditions.

Third absorption unit 202 is connected to second absorption unit 110, voltage clamping unit 112, resistor R1 and load unit 120 by load line L. Third absorption unit 202 is also connected to NMOS transistor N6. Third absorption unit 202 is configured to receive a current I3 from load line L. Third absorption unit 202 is configured to send current I3 to NMOS transistor N6. Third absorption unit 202 comprises PMOS transistor P6 and PMOS transistor P7. In some embodiments, third absorption unit 202 is configured to absorb one or more voltage drops from the load line L. In some embodiments, one or more NMOS transistors are used in third absorption unit 202.

The source of PMOS transistor P6 is connected to second absorption unit 110, voltage clamping unit 112, resistor R1 and load unit 120 by load line L and is configured to receive current I3. The body of PMOS transistor P6 is connected to the source of PMOS transistor P6. PMOS transistor P6 is connected in a diode configuration such that the gate of PMOS transistor P6 is connected to the drain of PMOS transistor P6. The drain and gate of PMOS transistor P6 are connected to the source of PMOS transistor P7. The drain of PMOS transistor P6 is configured to send the current I3 to PMOS transistor P7.

The source of PMOS transistor P7 is connected to the drain of PMOS transistor P6 and is configured to receive the current I3. The body of PMOS transistor P7 is connected to the source of PMOS transistor P7. PMOS transistor P7 is connected in a diode configuration such that the gate of PMOS transistor P7 is connected to the drain of PMOS transistor P7. The drain and gate of PMOS transistor P7 are connected to the drain of NMOS transistor N6. The drain of PMOS transistor P7 is configured to send the current I3 to NMOS transistor N6.

The gate of NMOS transistor N6 is connected to the source of third bias signal B3. In some embodiments, third bias signal B3 is a bias voltage received from a bias generation circuit (not shown). In some embodiments, third bias signal B3 is a bias voltage substantially equal to VDD and is received from a bias generation circuit (not shown). The drain of NMOS transistor N6 is connected to third absorption unit 202 (by the drain of PMOS transistor P7). In some embodiments, NMOS transistor N6 reduces EOS in third absorption unit 202 and second current mirror 204. The source of NMOS transistor N6 is connected to the drain of NMOS transistor N5.

Second current mirror 204 is connected to NMOS transistor N6. Second current mirror 204 is configured to receive a current from current source CS1 and voltage supply VDD. Second current mirror 204 is configured to receive a current I3 from NMOS transistor N6 and third absorption unit 202. In some embodiments, the current I3 is mirrored from the current received from the current source CS1. For example, current received from the current source CS1 is used to set the gate voltage of NMOS transistors N7 and N5; and the gate voltage of NMOS transistor N5 is used to set the value of current I3. In some embodiments, one or more PMOS transistors are used in second current mirror 204.

Current source CS1 is connected to voltage supply VDD, the drain of NMOS transistor N7 and resistor Rb. Current source CS1 is configured to provide a reference electric current for second current mirror 204.

The drain of NMOS transistor N7 is configured to receive current from current source CS1. The gate of NMOS transistor N7 is connected to the gate of NMOS transistor N5 (by resistor Rb). NMOS transistor N7 is connected in a diode configuration such that the gate of NMOS transistor N7 is connected to the drain of NMOS transistor N7. The source of NMOS transistor N7 is connected to ground.

Resistor Rb is connected to current source CS1, the gate and drain of NMOS transistor N7, the gate of NMOS transistor N5, and capacitor C2. In some embodiments, resistor Rb and capacitor C2 form a low pass filter to filter the signal received from NMOS transistor N7 and current source CS1.

Capacitor C2 is connected to the gate of NMOS transistor N5 and resistor Rb.

The drain of NMOS transistor N5 is configured to receive the current I3 from the source of NMOS transistor N6. The gate of NMOS transistor N5 is connected to the gate of NMOS transistor N7 (by resistor Rb). The source of NMOS transistor N5 is connected to ground. In some embodiments, during a high-load condition, NMOS transistor N5 is slightly biased and adjusts the current I3. In some embodiments, during a low-load condition, NMOS transistor N5 is heavily biased and adjusts the current I3. In some embodiments, during a no-load condition, NMOS transistor N5 is heavily biased and adjusts the current I3. In some embodiments, during a low-load or no-load condition, NMOS transistor N5 is a stability enhancement device by controlling the current I3.

Figure 3:
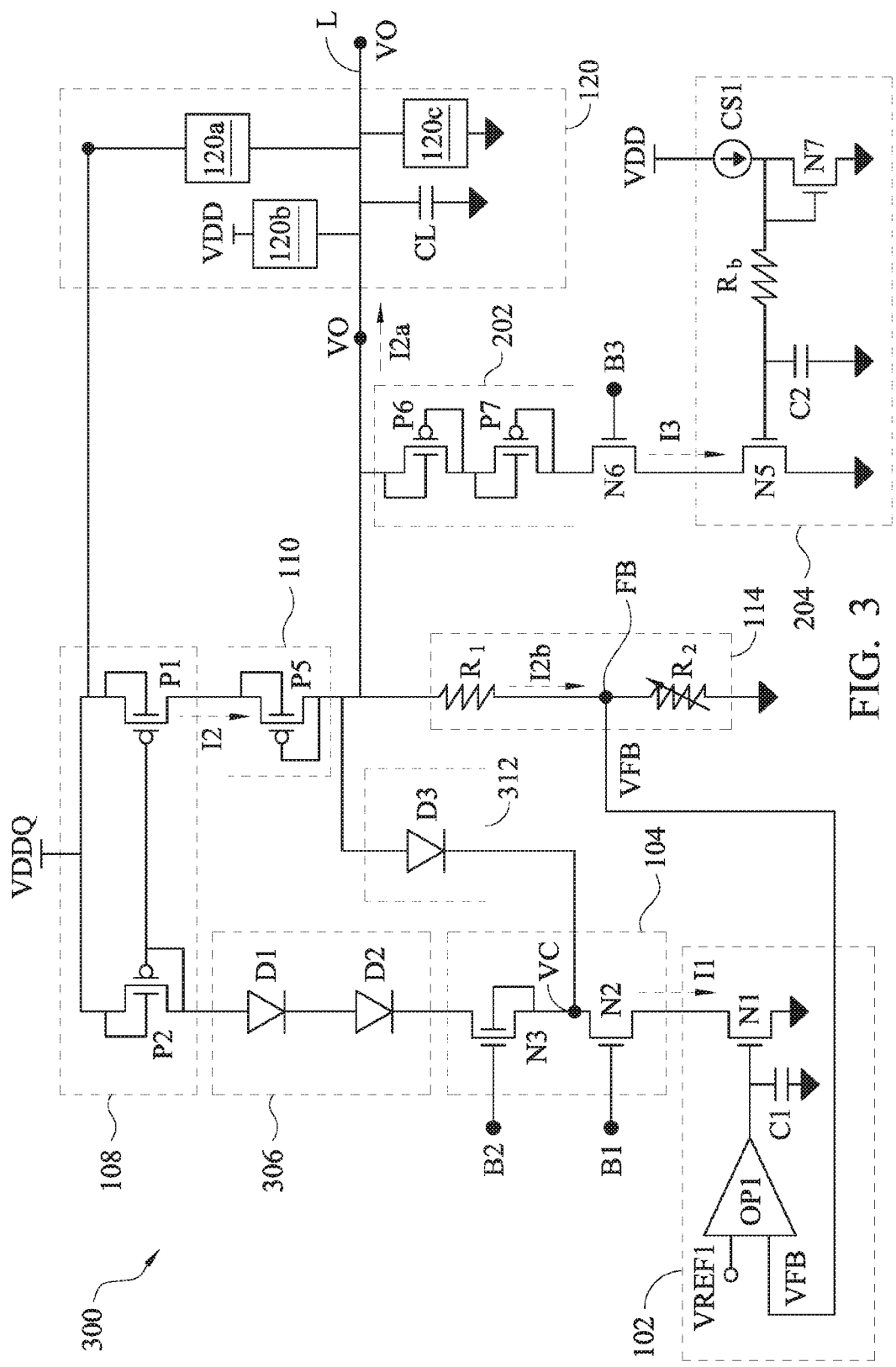
FIG. 3 is a schematic diagram of a voltage supply unit in accordance with one or more embodiments.

FIG. 3 is a schematic diagram of a voltage supply unit 300 in accordance with one or more embodiments. Voltage supply unit 300 is an embodiment of the voltage supply unit 200 shown in FIG. 2. As shown in FIG. 3, similar elements have a same reference number as shown in FIG. 2. In comparison with voltage supply unit 200 (shown in FIG. 2), voltage supply unit 300 includes first absorption unit 306 in place of first absorption unit 106. In comparison with voltage supply unit 200 (shown in FIG. 2), voltage supply unit 300 includes voltage clamping unit 312 in place of voltage clamping unit 112.

First absorption unit 306 is connected to cascode unit 104 and first current mirror 108. First absorption unit 306 is configured to receive a source current I1 from first current mirror 108. First absorption unit 306 is configured to send source current I1 to cascode unit 104. First absorption unit 306 comprises diode D1 and diode D2. In some embodiments, first absorption unit 306 is configured to absorb one or more voltage drops from the voltage supply VDDQ.

The anode of diode D1 is connected to first current mirror 108 (by the drain of PMOS transistor P2) and is configured to receive the source current I1. The cathode of diode D1 is configured to send the source current I1 to the anode of diode D2.

The anode of diode D2 is connected to the cathode of diode D1 and is configured to receive the source current I1. The cathode of D2 is configured to send the source current I1 to NMOS transistor N3.

Voltage clamping unit 312 is connected to second absorption unit 110, resistor R1, load unit 120 and cascode unit 104. Voltage clamping unit 312 comprises diode D3. In some embodiments, voltage clamping unit 312 reduces EOS in NMOS transistors N2 and N3. In some embodiments, voltage clamping unit 312 is configured to clamp the voltage at node VC at a first intermediate voltage. In some embodiments, the first intermediate voltage is substantially equal to a voltage ranging between about the first bias signal B1 and about the second bias signal B2. In some embodiments, the first intermediate voltage is substantially equal to a voltage ranging between about VDD and about 2*VDD. In some embodiments, the first intermediate voltage is substantially equal to a voltage of about 1.5*VDD. The source of NMOS transistor N2 is connected to the drain of NMOS transistor N1. In some embodiments, voltage clamping unit 312 is optional.

Figure 4:
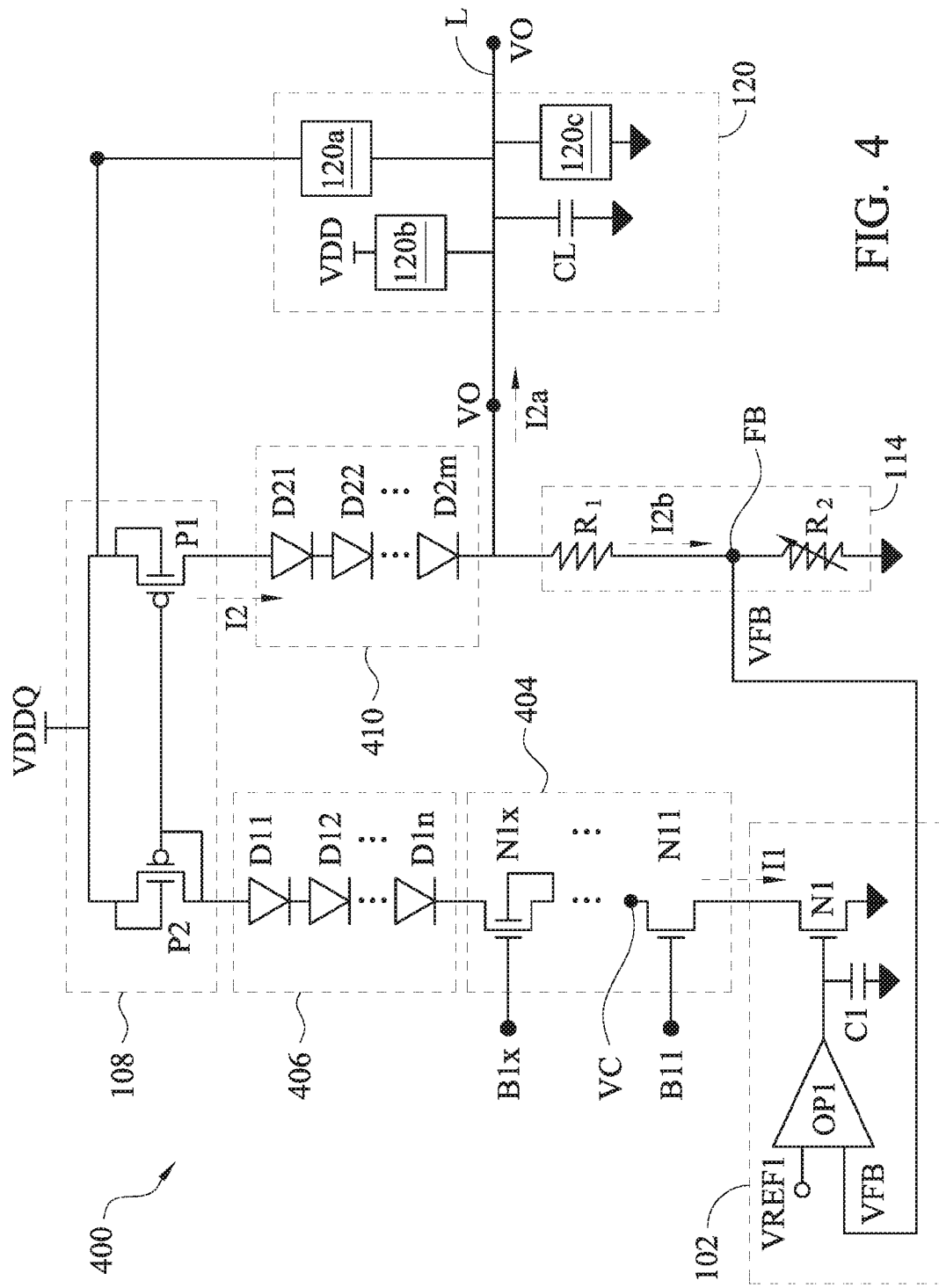
FIG. 4 is a schematic diagram of a voltage supply unit in accordance with one or more embodiments.

FIG. 4 is a schematic diagram of a voltage supply unit 400 in accordance with one or more embodiments. Voltage supply unit 400 is an embodiment of the voltage supply unit 100 shown in FIG. 1. As shown in FIG. 4, similar elements have a same reference number as shown in FIG. 1. In comparison with voltage supply unit 100 (shown in FIG. 1), voltage supply unit 400 does not include voltage clamping unit 112. In comparison with voltage supply unit 100 (shown in FIG. 1), voltage supply unit 400 includes cascode unit 404 in place of cascode unit 104. In comparison with voltage supply unit 100 (shown in FIG. 1), voltage supply unit 400 includes first absorption unit 406 in place of first absorption unit 106. In comparison with voltage supply unit 100 (shown in FIG. 1), voltage supply unit 400 includes second absorption unit 410 in place of second absorption unit 110.

In comparison with voltage supply unit 100 (shown in FIG. 1), voltage supply unit 400 is configured to generate output voltage signal VO as represented by formula 2:

$$VO = X*VDD \quad (2)$$

Where VO is the output voltage signal VO of voltage supply unit 400, X is a positive number and VDD is a voltage supply. In some embodiments, X is an integer.

Cascode unit 404 includes three or more NMOS transistor devices N11, . . . N1X (where X is an integer corresponding to the number of NMOS transistor devices) connected in the same configuration as that shown in FIG. 1. In comparison with cascode unit 104 (shown in FIG. 1), cascode unit 404 does not include voltage clamping unit 112. Each of the NMOS transistor devices N11, . . . N1X are configured to receive a corresponding bias signal B1, . . . a Xth bias signal B1X. In some embodiments, the function of the cascode unit 404 is the same as cascode unit 104 (shown in FIG. 1). As shown in equation 2, the value of integer X determines the number of NMOS transistor devices N11, . . . N1X and bias input signals B11, . . . B1X in cascode unit 400.

In some embodiments, if the integer X is equal to 3, then the output voltage signal VO is substantially equal to 3*VDD and three NMOS transistors N11, N12 and N13 are used in cascode unit 404.

In this example, the first intermediate voltage between NMOS transistor N11 and N12 is substantially equal to a voltage ranging between about the first bias signal B11 and about the second bias signal B12. In some embodiments, the first intermediate voltage is substantially equal to a voltage ranging between about VDD and about 2*VDD. In some embodiments, the first intermediate voltage is substantially equal to a voltage of about 1.5*VDD. In this example, the second intermediate voltage between NMOS transistor N12 and N13 is substantially equal to a voltage ranging between about the second bias signal B12 and about the third bias signal B13. In some embodiments, the second intermediate voltage is substantially equal to a voltage ranging between about 2*VDD and about 3*VDD. In some embodiments, the second intermediate voltage is substantially equal to a voltage of about 2.5*VDD. In some embodiments, cascode unit 404 prevents electrical over stress (EOS) in voltage supply unit 400. In some embodiments, one or more PMOS transistors are used in cascode unit 404.

First absorption unit 406 includes diode devices D11, ... D1n (where n is an integer corresponding to the number of diode devices) in place of PMOS transistors P3 and P4.

The anode of diode D11 is connected to first current mirror 108 (by the drain of PMOS transistor P2) and is configured to receive the source current I1. The cathode of diode D11 is configured to send the source current I1 to the anode of diode D1n.

The anode of diode D1n is connected to the cathode of diode D11 and is configured to receive the source current I1. The cathode of diode D1n is configured to send the source current I1 to NMOS transistor N1X.

In some embodiments, the function of the first absorption unit 406 is the same as first absorption unit 106 (shown in FIG. 1). In some embodiments, first absorption unit 406 is configured to absorb one or more voltage drops from the voltage supply VDDQ. For example, where VDDQ is substantially equal to 4*VDD, and output voltage signal VO is substantially equal to 2*VDD, then the integer n is equal to 3 or 4 such that first absorption unit 406 includes 3 diodes (D11, D12 and D13) or 4 diodes (D11, D12, D13 and D14). For example, where VDDQ is substantially equal to 3*VDD, and output voltage signal VO is substantially equal to 2*VDD, then the integer n is equal to 2 or 3 such that first absorption unit 406 includes 2 diodes (D11 and D12) or 3 diodes (D11, D12 and D13).

Second absorption unit 410 includes diode devices D21, ... D2m (where m is an integer corresponding to the number of diode devices) in place of PMOS transistor P5.

The anode of diode D21 is connected to first current mirror 108 (by the drain of PMOS transistor P1) and is configured to receive the supply current I2. The cathode of diode D21 is configured to send the supply current I2 to the anode of diode D2m.

The anode of diode D2m is connected to the cathode of diode D21 and is configured to receive the supply current I2. The cathode of diode D2m is configured to send the supply current I2 to load unit 120 and resistor R1.

In some embodiments, the function of the second absorption unit 410 is the same as second absorption unit 110 (shown in FIG. 1). In some embodiments, second absorption unit 410 is configured to absorb one or more voltage drops from the voltage supply VDDQ and to reduce EOS on PMOS transistor P1. For example, where VDDQ is substantially equal to 4*VDD, and output voltage signal VO is substantially equal to 2*VDD, then the integer n is equal to 3 or 4 such that second absorption unit 410 includes 3 diodes (D21, D22 and D23) or 4 diodes (D21, D22, D23 and D24). For example, where VDDQ is substantially equal to 3*VDD, and output voltage signal VO is substantially equal to 2*VDD, then the integer n is equal to 2 or 3 such that second absorption unit 410 includes 2 diodes (D21 and D22) or 3 diodes (D21, D22 and D23).

Figure 5:
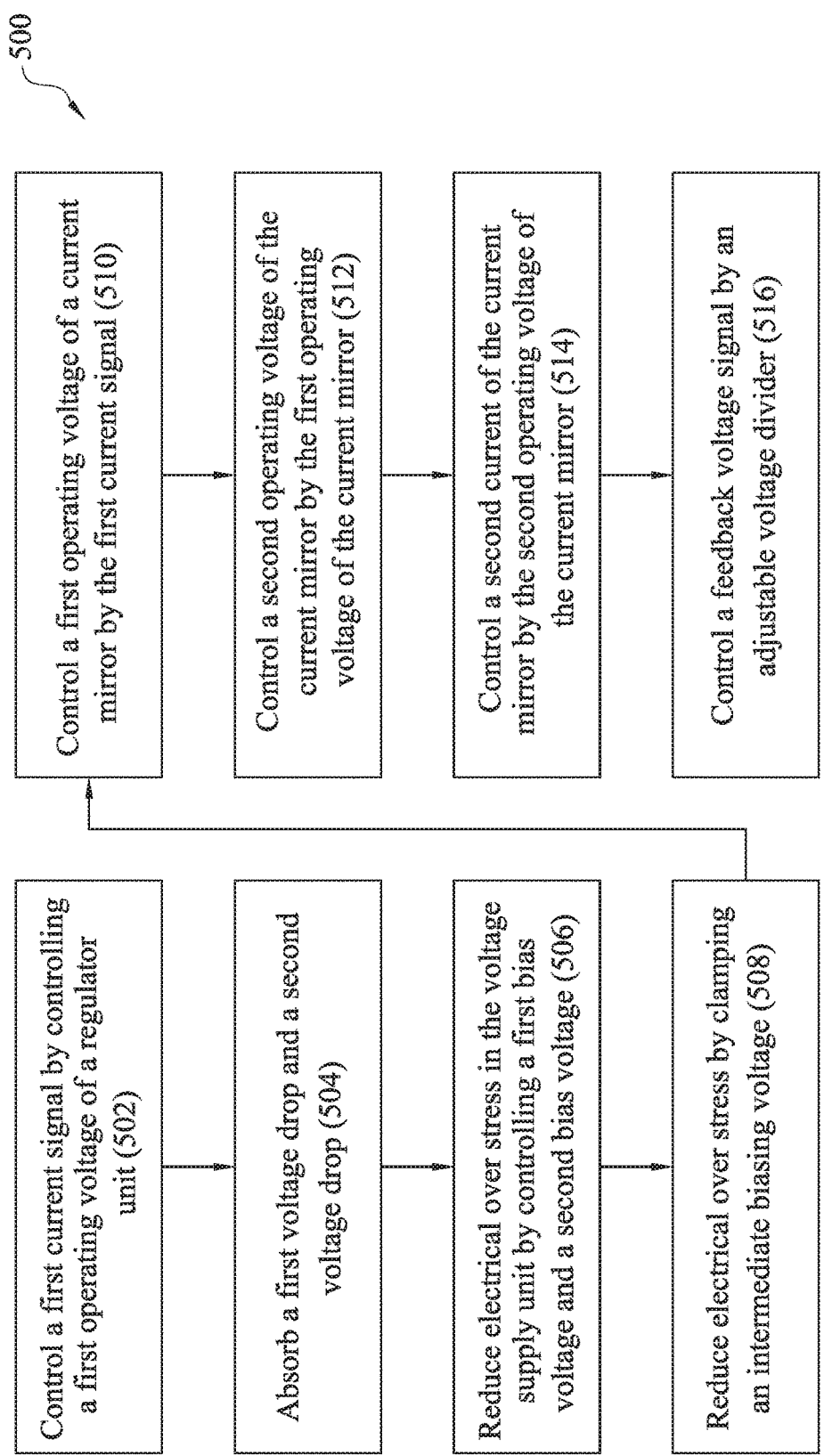
FIG. 5 is a flow chart illustrating a method in accordance with one or more embodiments.

FIG. 5 is a flow chart illustrating a method 500 of generating an intermediate voltage level from a high voltage level in a voltage supply unit in accordance with one or more embodiments. Method 500 begins with operation 502 in which a first current signal of a current mirror is controlled by a first operating voltage of a regulator unit.

In operation 504, a first voltage drop and a second voltage drop from the high voltage level are absorbed. In some embodiments, the first voltage drop is absorbed by a first P-type transistor and the second voltage drop is absorbed by a second P-type transistor.

In operation 506, the electrical over stress in the voltage supply unit is reduced by controlling a first bias voltage of a first N-type transistor and controlling a second bias voltage of a second N-type transistor.

In operation 508, the electrical over stress in the first N-type transistor and the second N-type transistor are reduced by clamping a voltage level between the first N-type transistor and the second N-type transistor to an intermediate biasing voltage level. In some embodiments, the intermediate biasing voltage level is between the first bias voltage and the second bias voltage.

In operation 510, a first operating voltage of the current mirror is controlled by the first current signal.

In operation 512, a second operating voltage of the current mirror is controlled by the first operating voltage of the current mirror.

In operation 514, a second current signal of the current mirror is controlled by the second operating voltage of the current mirror.

In operation 516, a feedback voltage signal is controlled by an adjustable voltage divider.

Figure 6:
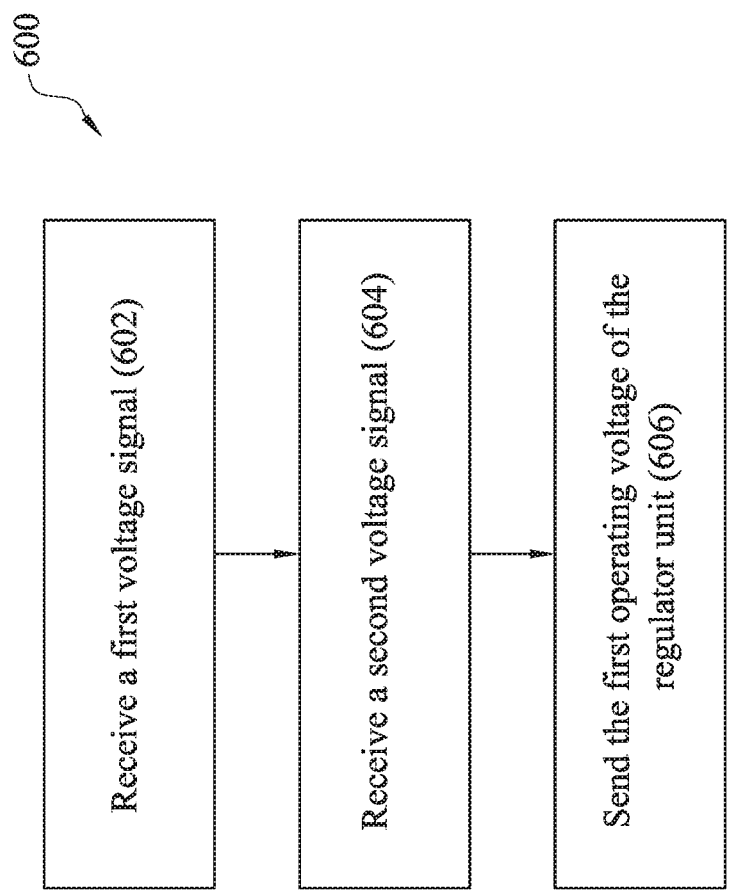
FIG. 6 is a flow chart illustrating a method in accordance with one or more embodiments.

FIG. 6 is a flow chart illustrating a method 600 of controlling a first operating voltage of a regulator unit in accordance with one or more embodiments. Method 600 is an embodiment of operation 502 shown in method 500. Method 600 begins with operation 602 in which a first voltage signal is received. In some embodiments, the first voltage signal is a reference voltage.

In operation 604, a second voltage signal is received. In some embodiments, the second voltage signal is substantially equal to the feedback voltage signal.

In operation 606, the first operating voltage of the regulator unit is sent.

One aspect of this description is related to a voltage supply unit that includes a regulator unit, a voltage divider, a current mirror, and a cascode unit. The regulator unit may be configured to receive a first voltage signal and a second voltage signal and generate a third voltage signal. The voltage divider may be electrically connected to the regulator unit and configured to generate the second voltage signal. The current mirror may be electrically connected to the regulator unit, an input voltage supply, and the voltage divider. The current mirror may be configured to generate a first current signal and a second current signal. The second current signal may be mirrored from the first current signal. The first current signal may be controlled by the third voltage signal. An output voltage supply signal may be controlled by the second current signal. The cascode unit may include a first terminal configured as an input node to receive the first current signal, a second terminal configured to receive a first bias voltage signal, a third terminal configured to receive a second bias voltage signal, and a fourth terminal electrically connected to the regulator unit.

Another aspect of this description is related to a voltage supply unit that includes a regulator unit, a feedback unit, a current mirror, and a cascode unit. The regulator unit may be configured to receive a first voltage signal and a second voltage signal, and generate a third voltage signal. The feedback unit may be configured to generate the second voltage signal based on a voltage level of an output voltage supply signal. The current mirror may be electrically connected to an input voltage supply and configured to generate a current signal. The cascode unit may include a first terminal configured as a first input node to receive the current signal, a second terminal configured to receive a first bias voltage signal, a third terminal configured to receive a second bias voltage signal, and a fourth terminal electrically connected to the regulator unit.

Still another aspect of this description is related to a method of generating an output voltage level from an input voltage level in a voltage supply unit. The method may include controlling a first current signal of a current mirror by a first operating voltage of a regulator unit, controlling a first operating voltage of the current mirror by the first current signal of the current mirror, controlling a second operating voltage of the current mirror by the first operating voltage of the current mirror, and controlling a second current signal of the current mirror by the second operating voltage of the current mirror. The method may further include generating the output voltage level based on the second current signal and reducing electrical over stress in the voltage supply unit by controlling a bias voltage of a first N-type transistor and a bias voltage of a second N-type transistor, wherein the first N-type transistor is configured to receive the first current signal.

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A voltage supply unit, comprising:
   a regulator unit configured to receive a first voltage signal and a second voltage signal, and generate a third voltage signal;
   a voltage divider electrically connected to the regulator unit, wherein the voltage divider is configured to generate the second voltage signal;
   a current mirror electrically connected to the regulator unit, an input voltage supply, and the voltage divider, wherein the current mirror is configured to generate a first current signal and a second current signal wherein the second current signal is mirrored from the first current signal, the first current signal is controlled by the third voltage signal, and an output voltage supply signal is controlled by the second current signal; and
   a cascode unit comprising:
      a first terminal configured as an input node to receive the first current signal,
      a second terminal configured to receive a first bias voltage signal,
      a third terminal configured to receive a second bias voltage signal, and
      a fourth terminal electrically connected to the regulator unit.

2. The voltage supply unit of claim 1 further comprising an absorption unit electrically connected to the current mirror and the cascode unit.

3. The voltage supply unit of claim 1 wherein the cascode unit comprises a first N-type transistor and a second N-type transistor, and wherein:
   a first terminal of the first N-type transistor is configured as a first input node to receive the first bias voltage signal,
   a second terminal of the first N-type transistor is configured as a second input node to receive the first current signal,
   a first terminal of the second N-type transistor is configured as a third input node to receive the second bias voltage signal,
   a second terminal of the second N-type transistor is configured as a fourth input node to receive the first current signal from the first N-type transistor, and
   a third terminal of the second N-type transistor is electrically connected to the regulator unit.

4. The voltage supply unit of claim 3 wherein the second terminal of the second N-type transistor is electrically connected to a control terminal of a first P-type transistor, and a second P-type transistor is electrically connected to the first P-type transistor.

5. The voltage supply unit of claim 3, further comprising a voltage clamping unit electrically connected to the second terminal of the second N-type transistor, wherein the voltage clamping unit is configured to maintain an intermediate voltage signal, wherein a level of the intermediate voltage signal is between a level of the first bias voltage signal and a level of the second bias voltage signal.

6. The voltage supply unit of claim 5 wherein the voltage clamping unit comprises a P-type diode-connected transistor.

7. The voltage supply unit of claim 6 wherein a first terminal of the P-type diode-connected transistor and a second terminal of the P-type diode-connected transistor are electrically connected to the second terminal of the second N-type transistor.

8. The voltage supply unit of claim 1 wherein the cascode unit comprises N N-type transistors, wherein N is an integer and wherein a voltage level of the output voltage supply signal (VO) is:

$$VO = N \cdot VDD,$$

where VDD is a supply voltage level.

9. The voltage supply unit of claim 1 wherein the cascode unit comprises N N-type transistors, wherein N is an integer and wherein each N-type transistor is configured to receive a corresponding bias voltage signal.

10. The voltage supply unit of claim 1, wherein the regulator unit comprises an N-type transistor, wherein:
   a first terminal of the N-type transistor is configured to receive the third voltage signal,
   a second terminal of the N-type transistor is electrically connected to the cascode unit, and
   a third terminal of the N-type transistor is electrically connected to a ground terminal.

11. A voltage supply unit, comprising:
   a regulator unit configured to receive a first voltage signal and a second voltage signal, and generate a third voltage signal;

a feedback unit configured to generate the second voltage signal based on a voltage level of an output voltage supply signal;

a current mirror electrically connected to an input voltage supply, wherein the current mirror is configured to generate a current signal; and a cascode unit comprising:
 a first terminal configured as a first input node to receive the current signal,
 a second terminal configured to receive a first bias voltage signal,
 a third terminal configured to receive a second bias voltage signal, and
 a fourth terminal electrically connected to the regulator unit.

12. The voltage supply unit of claim 11, wherein the regulator unit comprises an N-type transistor, and wherein:
 a first terminal of the N-type transistor is configured to receive the third voltage signal,
 a second terminal of the N-type transistor is electrically connected to the cascode unit and is configured to receive the current signal, and
 a third terminal of the N-type transistor is electrically connected to a ground terminal.

13. The voltage supply unit of claim 11 wherein the feedback unit comprises a voltage divider.

14. The voltage supply unit of claim 11 further comprising an absorption unit electrically connected to the current mirror and configured to absorb a voltage drop from the input voltage supply.

15. The voltage supply unit of claim 11 wherein the cascode unit comprises a first N-type transistor and a second N-type transistor, wherein:
 a first terminal of the first N-type transistor is configured as a second input node to receive a first bias voltage signal,
 a second terminal of the first N-type transistor is configured as a third input node to receive the current signal,
 a first terminal of the second N-type transistor is configured as a fourth input node to receive a second bias voltage signal,
 a second terminal of the second N-type transistor is configured as a fifth input node to receive the first current signal from the first N-type transistor, and
 a third terminal of the second N-type transistor is electrically connected to the regulator unit.

16. A method of generating an output voltage level from an input voltage level in a voltage supply unit, the method comprising:
 controlling a first current signal of a current mirror by a first operating voltage of a regulator unit;
 controlling a first operating voltage of the current mirror by the first current signal of the current mirror;
 controlling a second operating voltage of the current mirror by the first operating voltage of the current mirror;
 controlling a second current signal of the current mirror by the second operating voltage of the current mirror;
 generating the output voltage level based on the second current signal; and
 reducing electrical over stress in the voltage supply unit by controlling a bias voltage of a first N-type transistor and controlling a bias voltage of a second N-type transistor, wherein the first N-type transistor is configured to receive the first current signal.

17. The method of claim 16 further comprising:
 receiving a first voltage signal, wherein the first voltage signal is a reference voltage signal;
 receiving a second voltage signal, wherein the second voltage signal is a feedback voltage signal; and
 generating the first operating voltage of the regulator unit based on the first voltage signal and the second voltage signal.

18. The method of claim 16 further comprising clamping a cascode voltage level at a node of the first N-type transistor and a node of the second N-type transistor.

19. The method of claim 18 further comprising maintaining an intermediate voltage level at the node of the first N-type transistor and the node of the second N-type transistor, wherein the intermediate voltage level is between a level of the bias voltage of the first N-type transistor and a level of the bias voltage of the second N-type transistor.

20. The method of claim 16 further comprising absorbing a voltage drop along a conductive path from the current mirror to an output voltage node.

\* \* \* \* \*